United States Patent
Chang

(10) Patent No.: US 11,479,481 B2
(45) Date of Patent: Oct. 25, 2022

(54) METHOD FOR PROCESSING METALLURGICAL WASTE ACID

(71) Applicants: MACH TECHNOLOGY CO., LTD., Taipei (TW); MACH Technology (Linyi) Co., Ltd., Linyi (CN); Chun-Gen Chang, Taipei (TW)

(72) Inventor: Chun-Gen Chang, Taipei (TW)

(73) Assignees: MACH TECHNOLOGY CO., LTD., Taipei (TW); MACH TECHNOLOGY (LINYI) CO., LTD., Linyi (CN); Chun-Gen Chang, Taipei (TW)

( * ) Notice: Subject to any disclaimer, the term of this patent is extended or adjusted under 35 U.S.C. 154(b) by 224 days.

(21) Appl. No.: 16/942,017

(22) Filed: Jul. 29, 2020

(65) Prior Publication Data

US 2021/0032126 A1     Feb. 4, 2021

Related U.S. Application Data

(60) Provisional application No. 62/879,644, filed on Jul. 29, 2019.

(51) Int. Cl.
*C02F 1/28*     (2006.01)
*C01F 5/40*     (2006.01)
(Continued)

(52) U.S. Cl.
CPC ............. *C02F 1/281* (2013.01); *C01F 5/40* (2013.01); *C02F 2101/103* (2013.01); *C02F 2103/16* (2013.01); *C02F 2305/14* (2013.01)

(58) Field of Classification Search
CPC ........ C02F 1/281; C02F 1/66; C02F 2103/16; C02F 2101/103; C02F 2305/14;
(Continued)

(56) References Cited

FOREIGN PATENT DOCUMENTS

CN     103553197 A  *   2/2014
CN     105695733 A  *   6/2016
(Continued)

OTHER PUBLICATIONS

Schouwenaars, R., Montoya-Bautista, C.V., Isaacs-Páez, E.D. et al. Removal of arsenic III and V from laboratory solutions and contaminated groundwater by metallurgical slag through anion-induced precipitation . . . Environ Sci Pollut Res 24, 25034-25046 (2017). https://doi.org/10.1007/s11356-017-0120-1 (Year: 2017).*
(Continued)

*Primary Examiner* — Magali P Slawski
*Assistant Examiner* — Bernadette Karen McGann
(74) *Attorney, Agent, or Firm* — Locke Lord LLP; Tim Tingkang Xia, Esq.

(57) ABSTRACT

A method for processing a metallurgical waste acid, includes the following steps. First, a certain amount of a metallurgical waste acid is added into a reaction kettle. Then, the metallurgical waste acid and magnesium slag are added into the reaction kettle in a weight ratio ranging from 5:1 to 15:1 and are stirred into a mixed waste water. The reaction temperature is the room temperature. Then, a certain amount of sulfuric acid is added into the reaction kettle to control the mixed waste water within a pH range. At last, the mixed waste water is filtered.

13 Claims, 9 Drawing Sheets

(51) Int. Cl.
*C02F 101/10* (2006.01)
*C02F 103/16* (2006.01)

(58) Field of Classification Search
CPC .... C01F 5/40; B01F 35/2215; B01F 35/2216; B01F 35/22161; B01F 2035/35; B01F 2101/2204; B01F 2101/25; B01F 2101/26; B01F 2101/28; B01F 2101/305; B01F 2101/45; C04B 5/00; C04B 33/138; C04B 18/14; C04B 7/147
See application file for complete search history.

(56) References Cited

FOREIGN PATENT DOCUMENTS

| CN | 106591889 A | * | 4/2017 | |
|---|---|---|---|---|
| CN | 110028039 A | * | 7/2019 | ............... C01B 3/08 |

OTHER PUBLICATIONS

Machine generated English translation of CN 103553197 (Year: 2014).*

Machine generated English translation of CN 105695733 (Year: 2016).*

* cited by examiner

| Element | Site 1 Atomic % | Site 2 Atomic % | Site 3 Atomic % |
|---|---|---|---|
| Mg | 88.46 | 91.29 | 86.30 |
| Al | 7.34 | 6.47 | 10.05 |
| O | 4.20 | 2.23 | 3.65 |
| Total | 100.00 | 100.00 | 100.00 |

FIG. 2

| | | metallurgical waste acid/250g | | | | | | | | |
|---|---|---|---|---|---|---|---|---|---|---|
| metallurgical waste acid | pH value in solution | < 0 | | | | | | | | |
| | arsenic content in Cu-smelting waste acid (mg/L) | 5.02 | | | | 10.54 | | | | |
| | magnesium slag content (g) | 25 | | | | 25 | | | | |
| | sulfuric acid content (g) | 50~70 | | | | 50~70 | | | | |
| | reaction temperature (°C) | 25~35 | | | | 25~35 | | | | |
| | pH value in solution during reaction | 6-8 | | | | 6-8 | | | | |
| reaction data | stirring period (minutes) | 20 | 40 | 60 | 90 | 20 | 40 | 60 | 90 | |
| | pH value in solution after filtration of solution | 6.9 | 7.3 | 7.5 | 7.8 | 6.8 | 7.4 | 7.5 | 7.8 | |
| | arsenic content in solution (mg/L) | 0.012 | 0.0061 | 0.0056 | 0.0051 | 0.021 | 0.0072 | 0.0065 | 0.0059 | |

FIG. 3A

| metallurgical waste acid | | metallurgical waste acid/250g | | | | | | | | |
|---|---|---|---|---|---|---|---|---|---|---|
| | pH value in solution | < 0 | | | | | | | | |
| | arsenic content in Cu-smelting waste acid (mg/L) | 15.99 | | | | 59.57 | | | | |
| | magnesium slag content (g) | 25 | | | | 25 | | | | |
| | sulfuric acid content (g) | 50~70 | | | | 50~70 | | | | |
| reaction data | reaction temperature (°C) | 25~35 | | | | 25~35 | | | | |
| | pH value in solution during reaction | 6-8 | | | | 6-8 | | | | |
| | stirring period (minutes) | 20 | 40 | 60 | 90 | 20 | 40 | 60 | 90 | |
| | pH value in solution after filtration of solution | 6.9 | 7.3 | 7.5 | 7.8 | 6.8 | 7.4 | 7.5 | 7.8 | |
| | arsenic content in solution (mg/L) | 0.035 | 0.0093 | 0.0086 | 0.0079 | 0.221 | 0.0379 | 0.0352 | 0.0323 | |

FIG. 3B

| metallurgical waste acid | pH value in solution | < 0 | | | | | | | | | |
|---|---|---|---|---|---|---|---|---|---|---|---|
| | arsenic content in Cu-smelting waste acid (mg/L) | 5.02 | | | | | 10.54 | | | | |
| | magnesium slag content (g) | 25 | | | | | 25 | | | | |
| | sulfuric acid content (g) | 50-70 | | | | | 50-70 | | | | |
| reaction data | reaction temperature (°C) | 25~35 | | | | | 25~35 | | | | |
| | pH value in solution during reaction | 6-8 | | | | | 6-8 | | | | |
| | stirring period (minutes) | 20 | 40 | 60 | 90 | | 20 | 40 | 60 | 90 | |
| | pH value in solution after filtration of solution | 6.5 | 7.1 | 7.3 | 7.5 | | 6.6 | 7.2 | 7.4 | 7.6 | |
| | arsenic content in solution (mg/L) | 0.072 | 0.037 | 0.035 | 0.033 | | 0.136 | 0.047 | 0.042 | 0.038 | |

FIG. 5A

| | | metallurgical waste acid/250g | | | | | | | |
|---|---|---|---|---|---|---|---|---|---|
| metallurgical waste acid | pH value in solution | <0 | | | | | | | |
| | arsenic content in Cu-smelting waste acid (mg/L) | 15.99 | | | | 59.57 | | | |
| | magnesium slag content (g) | 25 | | | | 25 | | | |
| | sulfuric acid content (g) | 50-70 | | | | 50-70 | | | |
| | reaction temperature (°C) | 25~35 | | | | 25~35 | | | |
| reaction data | pH value in solution during reaction | 6-8 | | | | 6-8 | | | |
| | stirring period (minutes) | 20 | 40 | 60 | 90 | 20 | 40 | 60 | 90 |
| | pH value in solution after filtration of solution | 6.6 | 7.3 | 7.7 | 7.9 | 6.7 | 7.5 | 7.7 | 8.0 |
| | arsenic content in solution (mg/L) | 0.228 | 0.059 | 0.056 | 0.051 | 0.482 | 0.247 | 0.232 | 0.211 |

FIG. 5B

METHOD FOR PROCESSING METALLURGICAL WASTE ACID

REFERENCE TO RELATED APPLICATIONS

This application claims an invention which was disclosed in Provisional Application No. 62/879,644, filed on Jul. 29, 2019, entitled "METHOD FOR PROCESSING METALLURGICAL WASTE ACID". The benefit under 35 USC § 119(e) of the United States provisional application is hereby claimed, and the aforementioned application is hereby incorporated herein by reference.

FIELD OF THE INVENTION

This disclosure generally relates to a method for processing a metallurgical waste acid, and more particularly, to a method for removing arsenic from the metallurgical waste acid by adding slag.

DESCRIPTION OF THE PRIOR ART

Arsenic is a toxic substance that has a wide range of ecological effects. When arsenic contained in the water is absorbed by plant roots, it may further enter the food chain and have a negative impact on animals. Arsenic has a significant impact on the human body. It may not only damage the functions of liver and kidney and the cardiovascular functions, but are also recognized as a Group 1 carcinogen by international research institutions, which may cause cancer in the human skin and the digestive system.

In the nowadays society, metallurgy, chemical engineering or even agriculture may cause arsenic-containing waste water to enter the environment and affect the ecology. Among them, taking metallurgical waste acids for example, arsenic mainly exists in the forms of As(III) and As(V) with a wide range of concentration, and the waste water itself may also be acidic. The current processes for industrial waste acids include ion exchange, adsorption, chemical precipitation, and so on.

As far as the conventional processing method is concerned, the filled resin for ion exchange has a high recycling cost, and the operation process is complicated, which is not suitable for processing large-amount high-concentration arsenic-containing waste acid. In addition, the adsorption effect of arsenic in the adsorption method involves quite complicated factors, including the solution temperature, the contact time, and even the initial concentration of arsenic in the solution, and so forth. Moreover, the precipitating agent added in the chemical precipitation method includes many combinations, most of which require an additional oxidation step in the process to enhance the precipitation efficiency.

In view of this, there is a need of a method for processing a metallurgical waste acid that is different from conventional methods and can effectively remove arsenic with simplified steps and lower cost.

SUMMARY OF THE INVENTION

In view of the above, one object of this disclosure is to provide a method for processing a metallurgical waste acid with low cost, simple steps and effective removal of arsenic.

Accordingly, one aspect of the present disclosure provides a method for processing a metallurgical waste acid, including steps of: providing a metallurgical waste acid including arsenic ions, copper ions, and sulfuric acid; providing magnesium slag including magnesium, a magnesium compound, and an aluminum compound or at least one chloride; mixing the metallurgical waste acid and the magnesium slag in a reaction kettle into a mixed reactant in a weight ratio ranging from 5:1 to 15:1 to carry out a reaction at a reaction temperature, wherein the magnesium slag is used for adsorbing and precipitating the arsenic ions in the metallurgical waste acid; adding sulfuric acid into the reaction kettle to control the mixed reactant within a pH range, and continuously stirring the mixed reactant for a stirring period to form a mixed product including a post-reaction precipitate and a post-reaction waste liquid; and filtering the mixed product and removing the post-reaction precipitate.

According to one or some aspects of the present disclosure, the atomic percentage of magnesium in the magnesium slag is higher than 14 atomic %; and more particularly, the atomic percentage of magnesium in the magnesium slag ranges from 14 to 91 atomic %.

According to one or some aspects of the present disclosure, the arsenic ions are inorganic arsenic ions.

According to one or some aspects of the present disclosure, the concentration of the arsenic ions contained in the metallurgical waste acid is higher than or equal to 0.5 mg/L; and more particularly, the concentration of the arsenic ions contained in the metallurgical waste acid ranges from 0.5 to 60 mg/L.

According to one or some aspects of the present disclosure, the concentration of the copper ions contained in the metallurgical waste acid is higher than or equal to 0.2 mg/L; and more particularly, the concentration of the copper ions contained in the metallurgical waste acid ranges from 0.2 to 2 mg/L.

According to one or some embodiments of the present disclosure, the at least one chloride is magnesium chloride, sodium chloride, calcium chloride or a combination thereof.

According to one or some aspects of the present disclosure, the pH value ranges from 6 to 8.

According to one or some aspects of the present disclosure, the stirring period is longer than or equal to 20 minutes.

According to one or some embodiments of the present disclosure, the reaction temperature ranges from 25 to 35° C.

After referring to the following embodiments herein, those with ordinary skill in the technical field of the present disclosure can easily understand the basic spirit and the purpose of the present disclosure, as well as the technical means and aspects of the present disclosure.

BRIEF DESCRIPTION OF THE DRAWINGS

In order to make the above and other objects, features, advantages, and embodiments of the present disclosure easier to understand, the description of the accompanying drawings is as follows:

FIG. 2 is a composition analysis table of a first magnesium slag according to one embodiment of the present disclosure;

FIG. 3A and FIG. 3B are reaction results tables according to one embodiment of the present disclosure;

FIG. 5A and FIG. 5B are reaction results tables according to one embodiment of the present disclosure.

DESCRIPTION OF THE PREFERRED EMBODIMENTS

Figure 1:
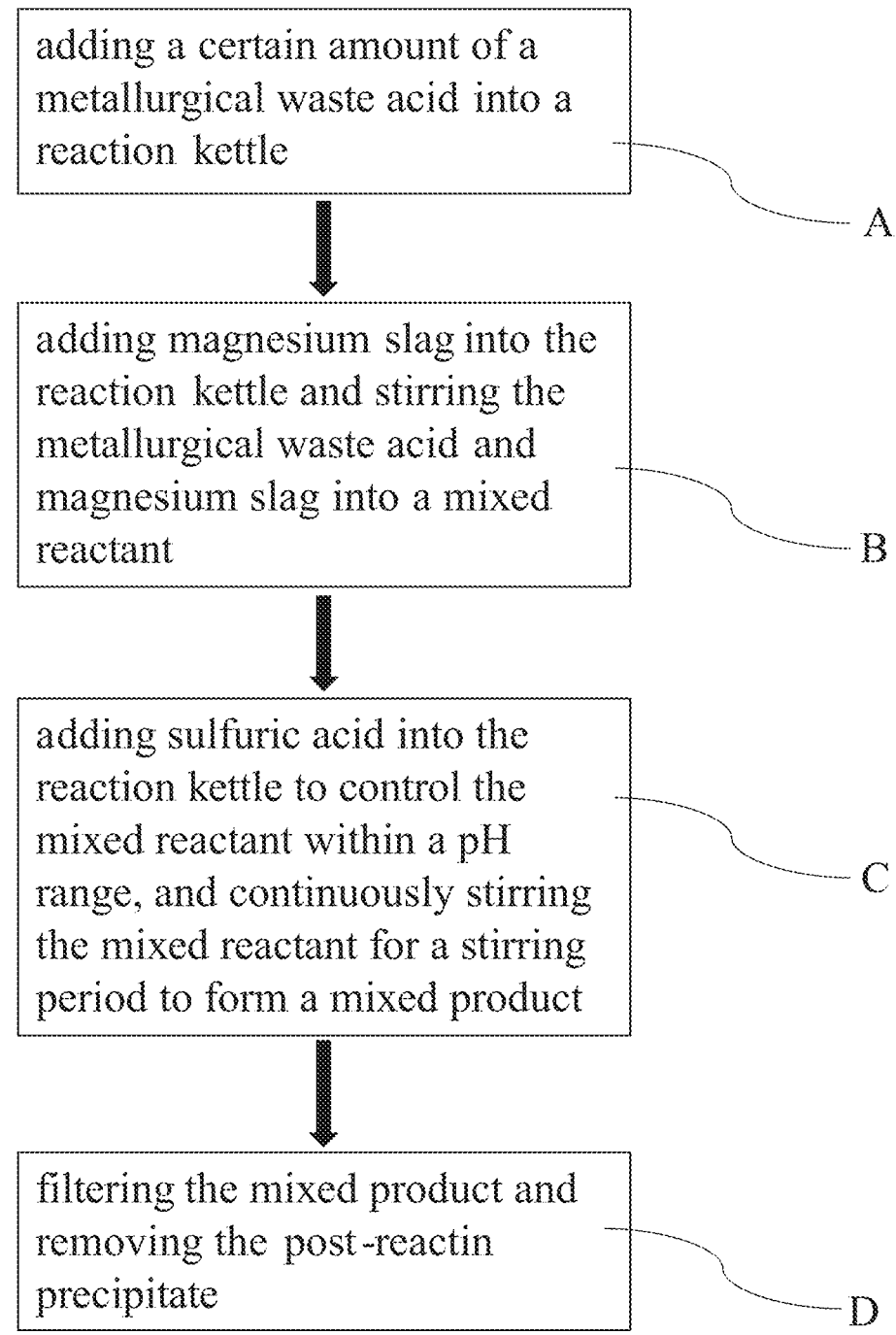
FIG. 1 is a flowchart of a method for processing a metallurgical waste acid according to one embodiment of the present disclosure.

The content of the present disclosure will be described in detail through the embodiments, but these embodiments are for illustrative purposes only. Those with ordinary skill in the art may easily think of various modifications and changes. Various embodiments of the present disclosure will be described in detail. Referring to the drawings, the same reference numerals in the drawings represent the same components. In this specification and the appended claims, unless the context indicates otherwise, "a" and "the" can also be interpreted as plural. Furthermore, the specification may be accompanied by titles and subtitles for easy reading, but these titles do not affect the scope of this disclosure. Several terms used in this specification will be defined in detail below.

Definition

The terms used in this specification generally have their usual meanings in the relevant fields within the scope of the present disclosure and in the specific context of each term. The specific terms used in this specification to describe the disclosure will be described below or elsewhere in this specification, so that the industry can understand the relevant descriptions of the disclosure. The scope and meaning of the same term in the same context are the same. In addition, there is more than one way to express the same thing. Accordingly, the terms discussed herein may be replaced by alternative terms and synonyms, and whether a term is described or discussed in detail herein does not have any special meaning. The synonyms for certain terms are provided herein, but the use of one or more synonyms does not mean that other synonyms are excluded. The examples provided in this specification (including examples of terms discussed herein) are for illustrative purposes only, and are not used to limit the scope and meaning of this disclosure or any exemplified terms. Likewise, the present disclosure is not limited to the various embodiments listed in this specification.

The present disclosure provides a method for processing a metallurgical waste acid. The method uses different reactants to be implemented according to a fixed basic process. The basic process is shown in FIG. 1 and includes the following steps.

In Step A: a certain amount of a metallurgical waste acid is added into a reaction kettle. The reaction kettle refers to a device that provides space for chemical reactions to take place in chemical production or experiments. Those with ordinary skill in the technical field of this disclosure can use distillation flasks or reactors used for industrial production and similar devices as required.

In Step B: the metallurgical waste acid and magnesium slag are added into the reaction kettle in a weight ratio ranging from 5:1 to 15:1 and are stirred into a mixed reactant to carry out a reaction at a reaction temperature, preferably 25 to 35° C. The weight ratio of the magnesium slag and the metallurgical waste acid is preferably 1:10.

In Step C: a certain amount of sulfuric acid is added into the reaction kettle to control the mixed reactant within a pH range, and the mixed reactant is continuously stirred for a stirring period to form a mixed product including a post-reaction precipitate and a post-reaction waste liquid. The pH value ranges in a neutral range that can be understood by a person with ordinary skill in the technical field of the present disclosure, preferably a pH value ranging from 6 to 8.

In Step D: the mixed product is filtered and the post-reaction precipitate is removed. It is understandable that Step D should involve a filter device, which can be changed within a reasonable range based on ordinary knowledge in the technical field of this disclosure.

According to the general knowledge in the technical field of this disclosure, it can be understood that the metallurgical waste acid and the magnesium slag are industrial wastes, with complex composition content. The composition of each sample is not exactly the same. However, this disclosure is based on multiple tests. The following several examples that can be implemented are provided for reference by those with ordinary knowledge in the technical field of the present disclosure.

Embodiment 1

In Embodiment 1, a metallurgical waste acid is first provided and a spectrophotometer is used to measure the components contained in the metallurgical waste acid. The metallurgical waste acid includes arsenic ions, copper ions, and sulfuric acid. More particularly, the arsenic ions contained in the metallurgical waste acid are inorganic arsenic ions with a concentration higher than or equal to 0.5 mg/L, preferably, ranging from 0.5 to 60 mg/L, which varies from sample to sample. In addition, the concentration of the copper ions contained in the metallurgical waste acid is higher than or equal to 0.2 mg/L, preferably, ranging from 0.02 to 2 mg/L, which varies from sample to sample. The concentration of sulfuric acid contained in the metallurgical waste acid is higher than or equal to 30 g/L, preferably, ranging from 30 to 60 g/L, which varies from sample to sample.

In Embodiment 1, a first magnesium slag is further provided. The first magnesium slag is a bottom slag from a die-casting plant, which includes magnesium and aluminum. It should be noted that the composition of the first magnesium slag is determined by energy-dispersive X-ray spectroscopy. Accordingly, the components contained in the first magnesium slag are all presented in element states with a content expressed in atomic percentage (atomic %). In Embodiment 1, the components of the first magnesium slag are divided into three sections for measurement. The results are shown in FIG. 2. According to FIG. 2, it can be reasonably inferred that the content of magnesium contained in the first magnesium slag ranges from 86.3 to 91.29 atomic %, the content of aluminum contained in the first magnesium slag ranges from 6.47 to 10.05 atomic %, and the content of oxygen contained in the first magnesium slag ranges from 2.23 to 4.2 atomic %.

Next, metallurgical waste acid samples containing different concentrations of arsenic ions and first magnesium slag samples are processed according to the basic processes. The results after the processes are shown in FIG. 3A and FIG. 3B. Referring to FIG. 3A and FIG. 3B, the concentration of arsenic ions contained in the metallurgical waste acid are 5.02, 10.54, 15.99 and 59.57 mg/L, respectively, for different samples. The metallurgical waste acid samples are then mixed and stirred with the first magnesium slag samples in a weight ratio of 10:1 at a reaction temperature being the room temperature, preferably, ranging from 25 to 35° C., for a stirring period ranging from 20 to 90 minutes. After completing Step D by stirring for different stirring periods, the content of arsenic ions contained in the post-reaction waste liquid is measured by hydride generation atomic absorption spectroscopy (HGAAS). According to the results shown in FIG. 3A and FIG. 3B, all of the concentrations of arsenic ions after the reaction significantly reduce. Except that the concentration of arsenic ions contained in the metallurgical waste acid sample with an arsenic ions concentration of 59.57 mg/L finally contains arsenic ions with a concentration of 0.0323 mg/L, the final arsenic ions concentrations of other samples are less than 0.01 mg/L. In addition, the total content of arsenic contained in the post-reaction precipitate, obtained from the sample with an arsenic ions concentration of 59.57 mg/L after completing Step D, is then determined by microwave digestion atomic spectrometry to be 94 mg/kg. From the results as shown above, it can be further confirmed that the adsorption of the arsenic component in the metallurgical waste acid can be achieved in this embodiment.

Embodiment 2

In Embodiment 2, a metallurgical waste acid is first provided and the components contained in the metallurgical waste acid and the samples used are as described in Embodiment 1.

Figure 4A:
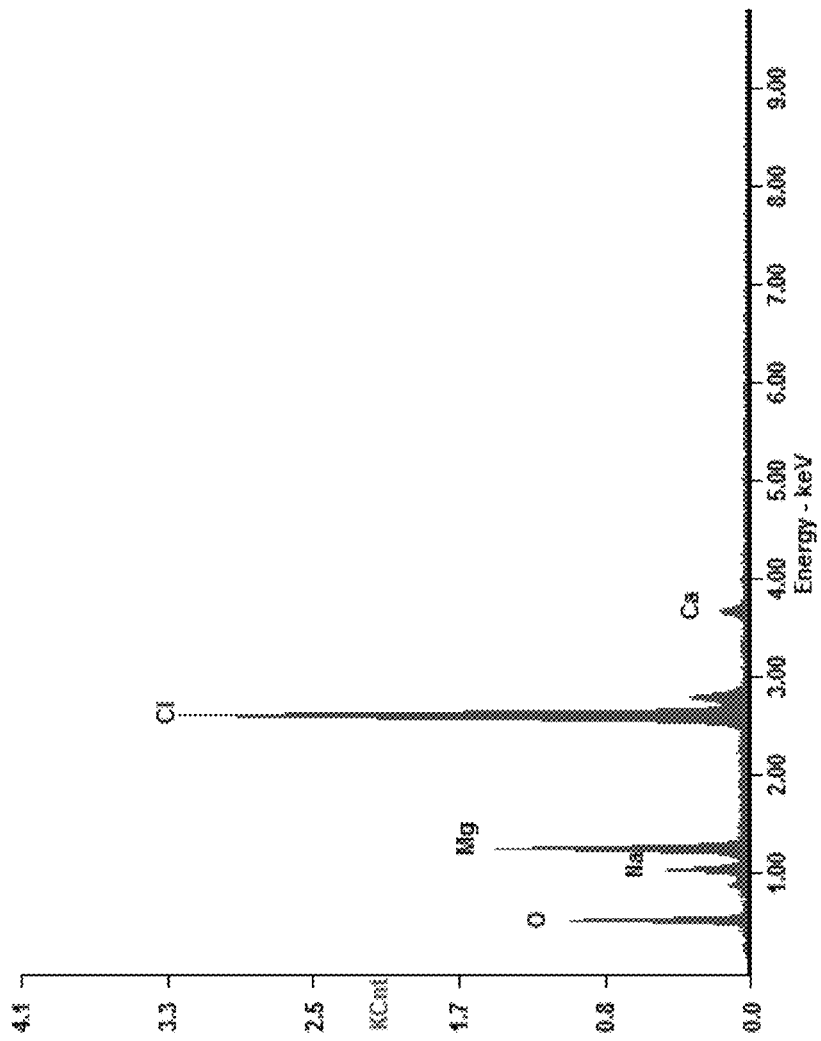
FIG. 4A to FIG. 4C are EDX spectrums and composition analysis tables of a second magnesium slag according to one embodiment of the present disclosure.
Figure 4B:
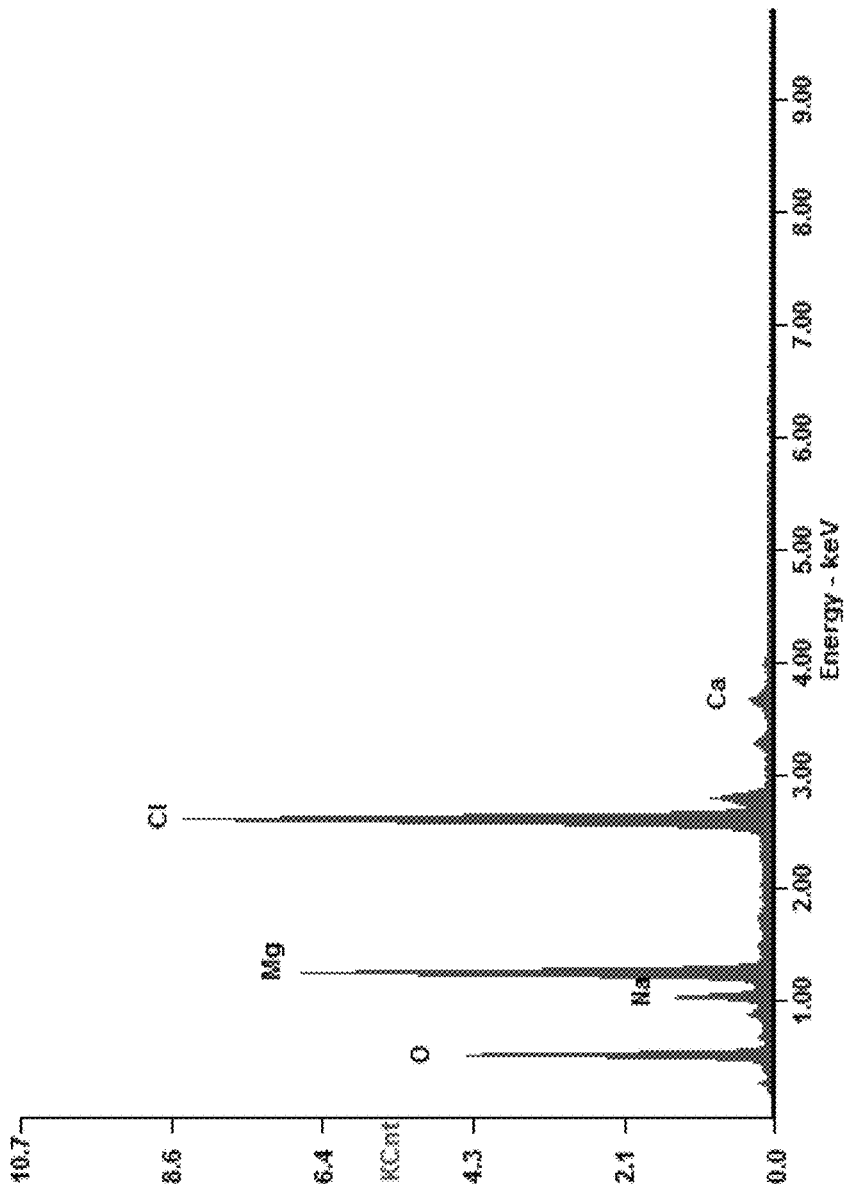
Figure 4C:
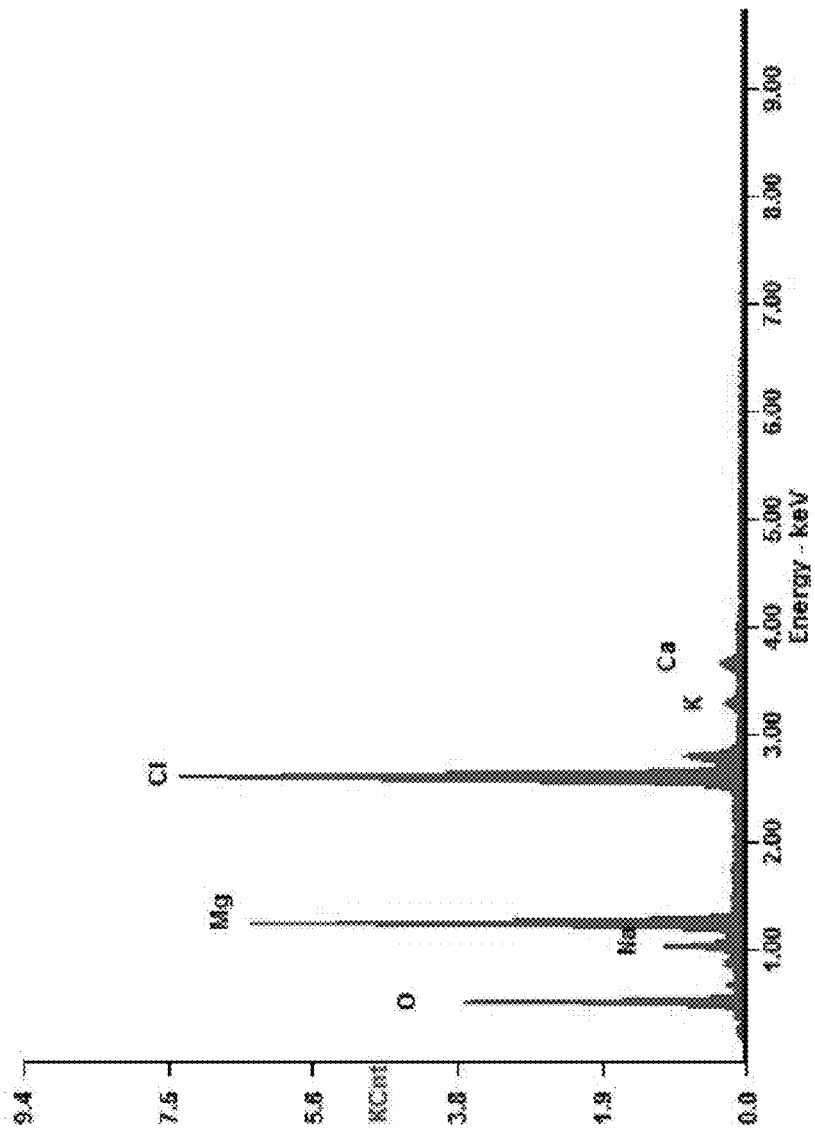

In Embodiment 2, a second magnesium slag is further provided. The second magnesium slag is a bottom slag from a die-casting plant, which includes magnesium and at least one chloride. It should be noted that the composition of the second magnesium slag is determined by energy-dispersive X-ray spectroscopy. Accordingly, the components contained in the second magnesium slag are all presented in element states with a content expressed in atomic percentage (atomic %). In Embodiment 2, the components of the second magnesium slag are divided into three sections for measurement. The results are shown in FIG. 4A to FIG. 4C. According to FIG. 4A to FIG. 4C, it can be reasonably inferred that the content of magnesium contained in the second magnesium slag ranges from 14.24 to 20.87 atomic %, the content of chlorine contained in the second magnesium slag ranges from 26.06 to 34.24 atomic %, and the content of oxygen contained in the second magnesium slag ranges from 43.04 to 47.16 atomic %. In addition, the second magnesium slag further includes metal ions such as sodium ions and calcium ions. Accordingly, it can be reasonably inferred that the at least one chloride is magnesium chloride, sodium chloride, calcium chlorine, or a combination thereof.

Next, metallurgical waste acid samples containing different concentrations of arsenic ions and second magnesium slag samples are processed according to the basic processes. The results after the processes are shown in FIG. 5A and FIG. 5B. Referring to FIG. 5A and FIG. 5B, the concentration of arsenic ions contained in the metallurgical waste acid are 5.02, 10.54, 15.99 and 59.57 mg/L, respectively, for different samples. The metallurgical waste acid samples are then mixed and stirred with the second magnesium slag samples in a weight ratio of 10:1 at a reaction temperature being the room temperature, preferably, ranging from 25 to 35° C., for a stirring period ranging from 20 to 90 minutes. After completing Step D by stirring for different stirring periods, the content of arsenic ions contained in the post-reaction waste liquid is measured by hydride generation atomic absorption spectroscopy (HGAAS). According to the results shown in FIG. 5A and FIG. 5B, all of the concentrations of arsenic ions after the reaction significantly reduce. Except that the concentration of arsenic ions contained in the metallurgical waste acid sample with an arsenic ions concentration of 59.57 mg/L finally contains arsenic ions with a concentration of 0.211 mg/L, the final arsenic ions concentrations of other samples are less than 0.1 mg/L.

The above content is merely illustrative of the present disclosure. Although various embodiments of the present disclosure have been described to a certain degree of characteristics, with reference to one or more embodiments, those with ordinary skill in the art to which the present disclosure belongs can still make numerous modifications to the disclosed implementations without departing from the spirit and scope of the present disclosure.

The invention claimed is:

1. A method for processing a metallurgical waste acid, comprising steps of:
   providing a metallurgical waste acid comprising arsenic ions, copper ions, and sulfuric acid;
   providing magnesium slag comprising magnesium, a magnesium compound, an aluminum compound and at least one chloride;
   subsequently mixing the metallurgical waste acid and the magnesium slag in a reaction kettle into a mixed reactant in a weight ratio ranging from 5:1 to 15:1 to carry out a reaction at a reaction temperature, wherein the magnesium slag is used for adsorbing and precipitating the arsenic ions in the metallurgical waste acid;
   subsequently adding sulfuric acid into the reaction kettle to control the mixed reactant within a pH range, and continuously stirring the mixed reactant for a stirring period to form a mixed product comprising a post-reaction precipitate and a post-reaction waste liquid; and
   subsequently filtering the mixed product and removing the post-reaction precipitate.

2. The method for processing a metallurgical waste acid according to claim 1, wherein the atomic percentage of magnesium in the magnesium slag is higher than 14 atomic %.

3. The method for processing a metallurgical waste acid according to claim 1, wherein the atomic percentage of magnesium in the magnesium slag ranges from 14 to 91 atomic %.

4. The method for processing a metallurgical waste acid according to claim 1, wherein the arsenic ions are trivalent arsenic ions.

5. The method for processing a metallurgical waste acid according to claim 1, wherein the concentration of the arsenic ions contained in the metallurgical waste acid is higher than or equal to 0.5 mg/L before the step of mixing the metallurgical waste acid and the magnesium slag.

6. The method for processing a metallurgical waste acid according to claim 1, wherein the concentration of the arsenic ions contained in the metallurgical waste acid ranges from 0.5 to 60 mg/L before the step of mixing the metallurgical waste acid and the magnesium slag.

7. The method for processing a metallurgical waste acid according to claim 1, wherein the pH value of the metallurgical waste acid is less than 0.

8. The method for processing a metallurgical waste acid according to claim 1, wherein the concentration of the copper ions contained in the metallurgical waste acid is higher than or equal to 0.2 mg/L before the step of mixing the metallurgical waste acid and the magnesium slag.

9. The method for processing a metallurgical waste acid according to claim 1, wherein the concentration of the copper ions contained in the metallurgical waste acid ranges from 0.2 to 2 mg/L before the step of mixing the metallurgical waste acid and the magnesium slag.

10. The method for processing a metallurgical waste acid according to claim 1, wherein the at least one chloride is magnesium chloride, sodium chloride, calcium chloride or a combination thereof.

11. The method for processing a metallurgical waste acid according to claim 1, wherein the pH value ranges from 6 to 8 after the step of adding sulfuric acid into the reaction kettle to the mixed reactant.

12. The method for processing a metallurgical waste acid according to claim 1, wherein the stirring period is longer than or equal to 40 minutes.

13. The method for processing a metallurgical waste acid according to claim 1, wherein the reaction temperature ranges from 25 to 35° C.

\* \* \* \* \*